(12) United States Patent
Ilinich et al.

(10) Patent No.: US 11,499,581 B2
(45) Date of Patent: Nov. 15, 2022

(54) SURFACE FEATURES FOR LOCATING NET SUBSTRATE BUTTONS TO ENABLE SELF-PIERCING RIVETING (SPR) ON BRITTLE AND LOW TOUGHNESS MATERIALS

(71) Applicant: Ford Global Technologies, LLC, Dearborn, MI (US)

(72) Inventors: Andrey Ilinich, Novi, MI (US); Amanda Freis, Ann Arbor, MI (US); Garret Huff, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1276 days.

(21) Appl. No.: 15/926,378

(22) Filed: Mar. 20, 2018

(65) Prior Publication Data
US 2019/0293101 A1    Sep. 26, 2019

(51) Int. Cl.
| | |
|---|---|
| *B32B 7/08* | (2019.01) |
| *F16B 5/04* | (2006.01) |
| *B32B 3/30* | (2006.01) |
| *B32B 15/20* | (2006.01) |
| *B32B 15/08* | (2006.01) |
| *F16B 19/08* | (2006.01) |

(52) U.S. Cl.
CPC ................ *F16B 5/04* (2013.01); *B32B 3/30* (2013.01); *B32B 7/08* (2013.01); *B32B 15/08* (2013.01); *B32B 15/20* (2013.01); *B32B 2605/08* (2013.01); *F16B 19/086* (2013.01)

(58) Field of Classification Search
CPC .. B32B 3/30; B32B 7/08; B32B 15/08; B32B 15/20; F16B 5/04; F16B 19/08; F16B 19/083; F16B 19/086
See application file for complete search history.

(56) References Cited

U.S. PATENT DOCUMENTS

| | | | |
|---|---|---|---|
| 6,842,962 B1 * | 1/2005 | Blacket | B21J 15/025 72/391.2 |
| 7,165,630 B2 | 1/2007 | Arnston et al. | |
| 8,783,773 B2 | 7/2014 | Seibold et al. | |
| 9,015,920 B2 | 4/2015 | Mauer et al. | |
| 9,186,867 B2 * | 11/2015 | Campbell | B32B 3/28 |
| 9,828,040 B2 | 11/2017 | Campbell et al. | |
| 2005/0086799 A1 * | 4/2005 | Kato | B21J 15/025 29/798 |
| 2015/0167710 A1 * | 6/2015 | Scott | B21J 15/025 403/282 |
| 2016/0107223 A1 | 4/2016 | Henke et al. | |
| 2017/0165739 A1 | 6/2017 | Wang et al. | |

* cited by examiner

*Primary Examiner* — Daniel J Wiley
(74) *Attorney, Agent, or Firm* — Burris Law, PLLC

(57) ABSTRACT

A dimpled substrate for use in an assembly having joined substrates is provided that defines at least one preformed interior cavity, at least one preformed exterior profile adjacent the interior cavity and defining a wall therebetween, and at least one locating feature configured to identify a location of the at least one preformed exterior profile. In one form, the locating feature is disposed in the preformed exterior profile or adjacent to the preformed exterior profile. Alternatively, the locating feature is a notch formed into the dimpled substrate away from the preformed exterior profile.

16 Claims, 6 Drawing Sheets

SURFACE FEATURES FOR LOCATING NET SUBSTRATE BUTTONS TO ENABLE SELF-PIERCING RIVETING (SPR) ON BRITTLE AND LOW TOUGHNESS MATERIALS

FIELD

The present disclosure relates to the joining of various materials in an assembly, and more particularly to accurately installing fasteners such as self-piercing rivets into workpieces/substrates of an assembly.

BACKGROUND

The statements in this section merely provide background information related to the present disclosure and may not constitute prior art.

As the automotive industry continues to focus on reducing the weight of vehicles to meet customer expectations on fuel economy and CAFE (Corporate Average Fuel Economy) requirements, interest in alternative materials including carbon fiber composite applications has increased. In body-in-white structures, joining methods have traditionally relied on resistance-spot welding (e.g., in steel structures).

In the case of aluminum intensive vehicles and other mixed metal joining applications, self-piercing rivet technology prevails. One advantage of self-piercing rivet technology is that it is a high production volume assembly process. Self-piercing rivet technology is compatible with adhesive and both methods can be used together. The substrate material must be ductile enough to form a "button", i.e., protrusion, which is the result of creating the joint and the necessary deformation to provide mechanical interlock.

Composite materials, such as carbon fiber, glass fiber or natural fiber composites, can be limited in application due to challenges relating to joining parts together. Frequently, these composites have limited ductility and are not well adapted to large displacements and deformation required to join parts together with self-piercing rivets. Other non-composite materials having higher strength and light weight are also often brittle and challenging to join using self-piercing rivet technology.

A challenge often faced with self-piercing rivet technology, however, is that the location of a site for rivet installation may be difficult to identify. This challenge is particularly exacerbated in high-volume automated production settings, in which it is desirable to make the joint with little or no impact on cycle time and equipment.

The issue of accurately locating rivet installation sites to join a variety of materials, and particularly in a high-volume production environment, is addressed by the present disclosure.

SUMMARY

In one form, a dimpled substrate for use in an assembly having joined substrates is provided. The dimpled substrate defines at least one preformed interior cavity, at least one preformed exterior profile adjacent the interior cavity and defining a wall therebetween, and at least one locating feature configured to identify a location of the at least one preformed exterior profile.

In one variation, the locating feature is disposed on the preformed exterior profile. In another variation, the locating feature is disposed adjacent to the preformed exterior profile. In yet another variation, the locating feature is a notch formed into the dimpled substrate away from the preformed exterior profile. The locating feature may be selected from the group consisting of surface texturing, laser marking, laser projection, ink application, dimpling, chemical etching, a hole through the substrate adjacent to the preformed exterior profile, an indent, a bead, and an embossment, among others. In another variation, the locating feature is configured to identify the location of the preformed exterior profile for a vision system.

In other variations, the wall has a variable thickness. Further, the dimpled substrate may be an aluminum casting, an aluminum extrusion, or a composite material.

In another form, an assembly is provided, which includes an upper substrate and a dimpled substrate, wherein the dimpled substrate defines a preformed interior cavity, a preformed exterior profile adjacent the preformed interior cavity and defining a wall therebetween, and a locating feature configured to identify a location of the preformed exterior profile. The assembly further includes a self-piercing rivet extending through the upper substrate and into the preformed interior cavity of the dimpled substrate, and in one form, the preformed interior cavity is not plastically deformed after installation of the self-piercing rivet.

In one variation, the locating feature is disposed on the preformed exterior profile or adjacent to the preformed exterior profile. Alternatively, the locating feature is a notch formed into the dimpled substrate away from the preformed exterior profile. The locating feature may be selected from the group consisting of surface texturing, laser marking, laser projection, ink application, dimpling, chemical etching, a hole through the substrate adjacent to the preformed exterior profile, an indent, a bead, and an embossment, among other approaches to providing an indicia of a location for installation of the self-piercing rivet.

In another variation, the wall defined by the preformed exterior profile defines a variable thickness.

In still another form, a method of locating a feature for installation of a self-piercing rivet is provided. The method comprises positioning an upper substrate and positioning a dimpled substrate adjacent to the upper substrate, wherein the dimpled substrate comprises at least one preformed interior cavity, at least one preformed exterior profile adjacent the interior cavity and defining a wall therebetween, and at least one locating feature configured to identify a location of the at least one preformed exterior profile. The method further comprises the steps of identifying a location of the locating feature, positioning an installation tool adjacent to the locating feature, and installing the self-piercing rivet through the upper substrate and into the lower substrate.

In one variation, the locating feature may be identified on an exterior portion of the dimpled substrate opposite the upper substrate. In another variation, the locating feature is disposed in the preformed exterior profile or adjacent to the preformed exterior profile. Alternatively, the locating feature is a notch formed into the dimpled substrate away from the preformed exterior profile. The locating feature may be selected from the group consisting of surface texturing, laser marking, laser projection, ink application, dimpling, chemical etching, a notch located on an edge of the substrate, a hole through the substrate adjacent to the preformed exterior profile, an indent, a bead, and an embossment, among other approaches to providing an indicia of a location for installation of the self-piercing rivet.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
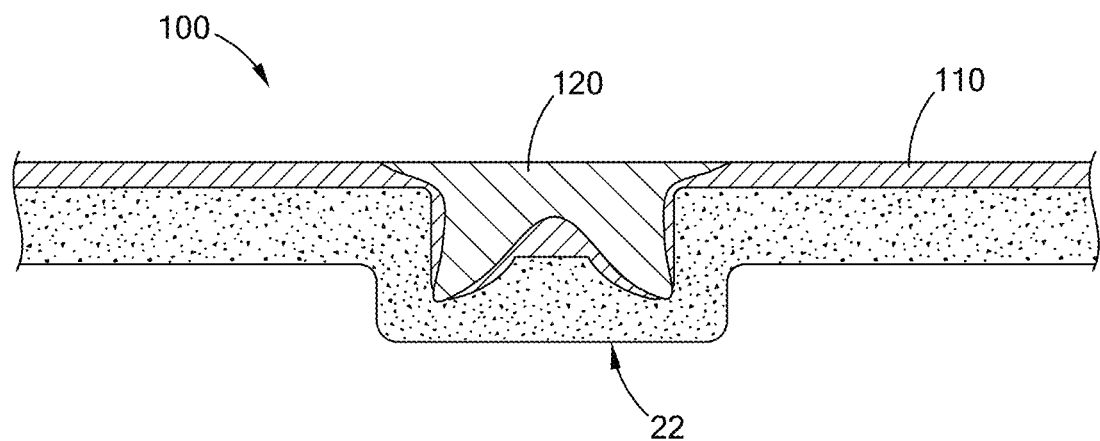
FIG. 1 is a cross-sectional view of an assembly having a self-piercing rivet (SPR) installed therein and constructed according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
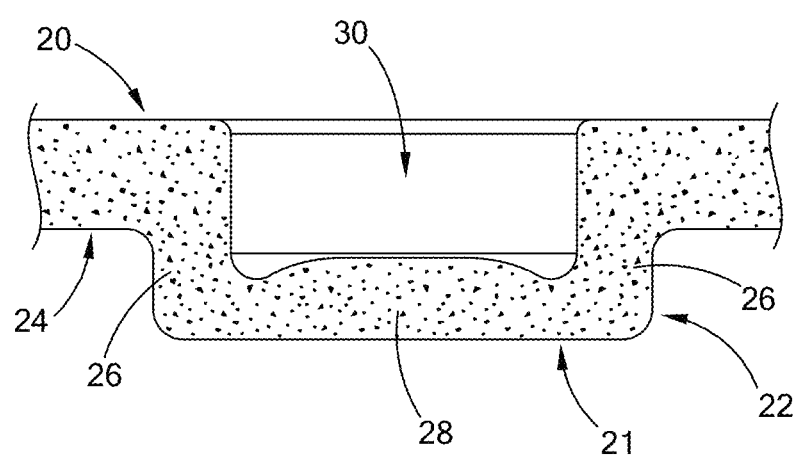
FIG. 2 is a cross-sectional view of a dimpled substrate from FIG. 1 constructed in accordance with the teachings of the present disclosure.

Referring to FIGS. 1 and 2, a dimpled substrate 20 for use in an assembly 100 having substrates joined by a self-piercing riveting (SPR) method is illustrated. Generally, the assembly 100 includes an upper substrate 110, the dimpled substrate 20, and a self-piercing rivet 120. Installation of self-piercing rivets 120 is described in greater detail in U.S. Pat. No. 9,828,040, which is commonly owned with the present application and the contents of which are incorporated herein by reference in their entirety.

The dimpled substrate 20 defines at least one preformed exterior profile 21 in the form of a button shaped protrusion or "button" 22. The button 22 extends downwardly from a lower surface 24 of the dimpled substrate 20 and is disposed in a predetermined location where a corresponding self-piercing rivet is to be inserted into the dimpled substrate 22, as described in greater detail below. The dimpled substrate 20 may be a cast part, a molded part, or a 3D-printed part, among others. In various forms of the present disclosure, the dimpled substrate 20 is an aluminum casting, an aluminum extrusion, or a composite material. It should be understood that these materials and methods of forming are merely exemplary and should not be construed as limiting the scope of the present disclosure.

The button 22 of the dimpled substrate 20 in this form is generally an open cylindrical shape having a peripheral wall 26 and a bottom wall 28. The exterior surfaces of the peripheral wall 26 and the bottom wall 28 together define the preformed exterior profile 21 as shown. The dimpled substrate 20 also includes a preformed interior cavity 30. The preformed interior cavity 30 is configured to receive a fastening system, such as the self-piercing rivet 120, which may or may not be plastically deformed after installation, as described in greater detail below.

In one form, the bottom wall 28 of the button 22 may define a variable thickness as shown. Details regarding the variable thickness of the bottom wall 28, among other features of the dimpled substrate 20, is shown and described in U.S. patent application Ser. No. 15/726,172, which is commonly owned with the present application, and the contents of which are incorporated herein by reference in its entirety.

Referring to FIGS. 2A-4C, the dimpled substrate 20 further includes at least one locating feature 32 configured to identify a location of the preformed exterior profile 21, and also the button 22 and its interior cavity 30, for more accurate location of the self-piercing rivet 120 during installation. Generally, the locating feature 32 may be on or near the preformed exterior profile 21 to identify the location for installation of the self-piercing rivet 120. The locating feature 32 may be a physical material applied to the dimpled substrate 20, a physical feature formed into or on the dimpled substrate 20, or an optical projection onto the dimpled substrate 20, among others. Examples of each of these forms of a locating feature 32 are provided in greater detail below but should not be construed as limiting the scope of the present disclosure. The inventors have discovered that many forms of providing the locating feature 32 can be realized in a variety of methods and thus the various forms illustrated and described herein are merely exemplary and should not be construed as limiting the scope of the present disclosure In FIGS. 2A-2C, the locating feature 32 is disposed on a bottom surface 34 of the bottom wall 28 of the preformed exterior profile 21 according to one form of the present disclosure. The locating feature 32 may be made in an initial manufacturing process step when the dimpled substrate 20 is formed, such as for example during casting or in a stamping die. More specifically, the locating feature 32 may be stamped into the bottom surface 34, causing limited plastic deformation of the material of the dimpled substrate 20 in order to create a location that can be detected my manual, optical, or other automated methods as set forth below. The locating feature 32 may take the form of those shown, or any number of geometrical shapes such as a dimple, an indent, a bead, or an embossment. Alternatively, the locating feature 32 may be applied during a post process step after the button 22 is formed, such as by way of example mechanical surface texturing, laser marking, laser projection (no modification of button or application of any additional material), ink application/stamping, or chemical etching, among others.

Figure 2A:
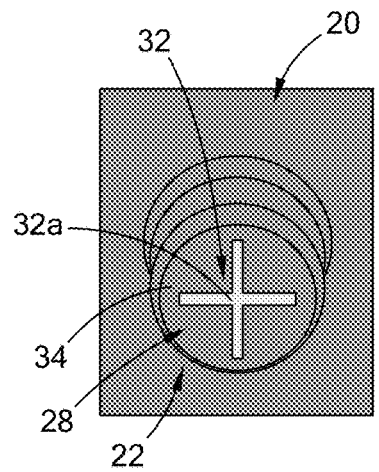
FIGS. 2A-2C are bottom views of a dimpled substrate having a locating feature on a bottom surface of a button according to the present disclosure.

Referring specifically to FIG. 2A, the locating feature defines a cross 32a comprising two intersecting lines generally perpendicular to each other, which can be detected by a vision system, for example. Once the locating feature 32a is detected, the location of the preformed exterior profile 21, and also the button 22 and its interior cavity 30, is identified to accurately position an installation tool above the dimpled substrate 20, as described in further detail below. Although the locating feature 32a is illustrated as a cross-shaped feature, the present disclosure is not limited to a cross 32a and other geometrical figures or shapes may be employed while remaining within the scope of the present disclosure.

Figure 2B:
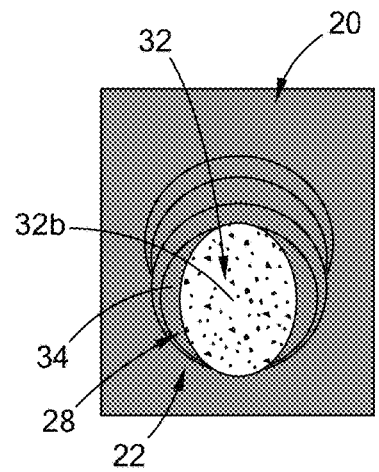

Referring to FIG. 2B, a locating feature 32b is in the form of surface texturing in a predetermined area along the preformed exterior profile 21 of the button 22. The surface texturing 32b can be detected by a vision system or other automated or mechanical means to identify the location of the preformed exterior profile 21, and hence the button 22 and its interior cavity 30.

Figure 2C:
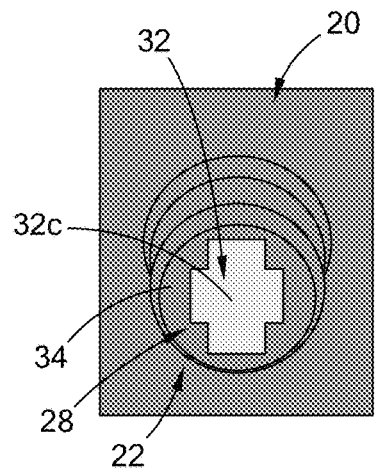

Referring to FIG. 2C, instead of the locating feature 32 being made in an initial processing step, the locating feature 32c is formed in a post-processing step, such as for example an additional stamping process, laser marking, laser projection, or ink application, among others. In this example, after the dimpled substrate 20 is formed, an ink applicator is used to apply a marking, which in this form is another cross-shaped feature. The locating feature 32c is then detected by an auxiliary system, such a vision system or other manual or automated methods to determine the location of the preformed exterior profile 21, and hence the button 22 and its interior cavity 30 for more accurate installation of the self-piercing rivet 120.

Figure 3A:
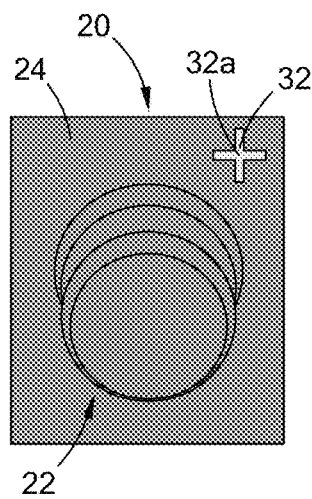
FIGS. 3A-3C are bottom views of a dimpled substrate having a locating feature next to a button according to the present disclosure.
Figure 3B:
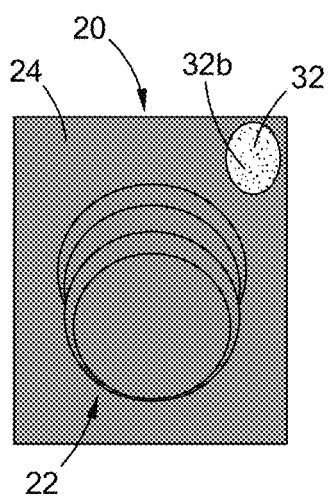
Figure 3C:
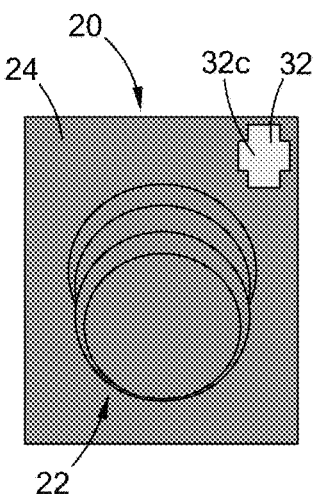

Referring to FIGS. 3A-3C, the locating feature 32', according to another form of the present disclosure is illustrated in which the locating feature 32a', 32b', and 32c' are disposed adjacent to, instead of directly on, the preformed exterior profile 21 on the lower surface 24 of the dimpled substrate 20. In this form, the locating feature 32 and the button 22 are preferably formed in the same processing step in order to maintain proper tolerances on the location of the button 22 from one button 22 to another.

Figure 4A:
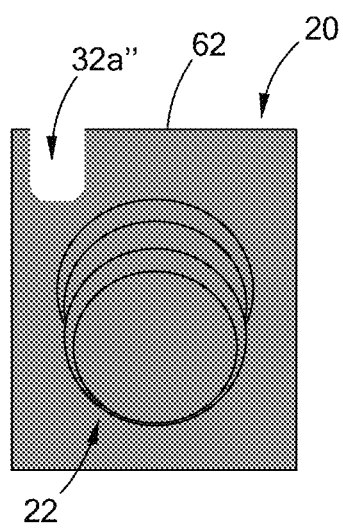
FIGS. 4A-4C are bottom views of a dimpled substrate having a locating feature notched into the lower substrate according to the present disclosure.
Figure 4B:
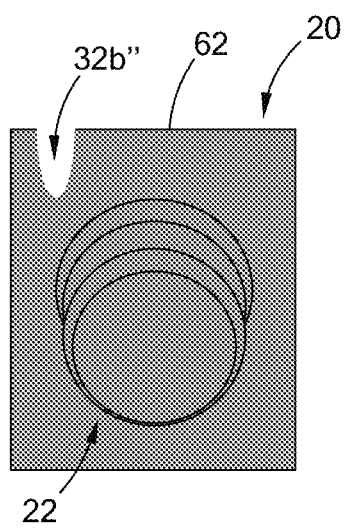
Figure 4C:
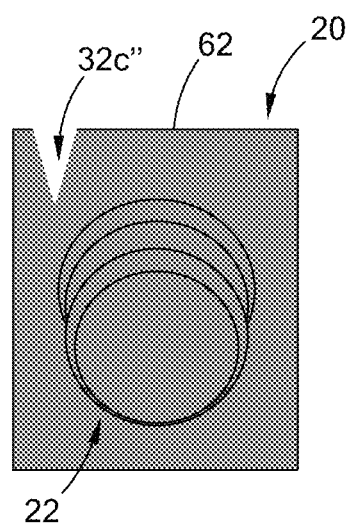
Figure 5:
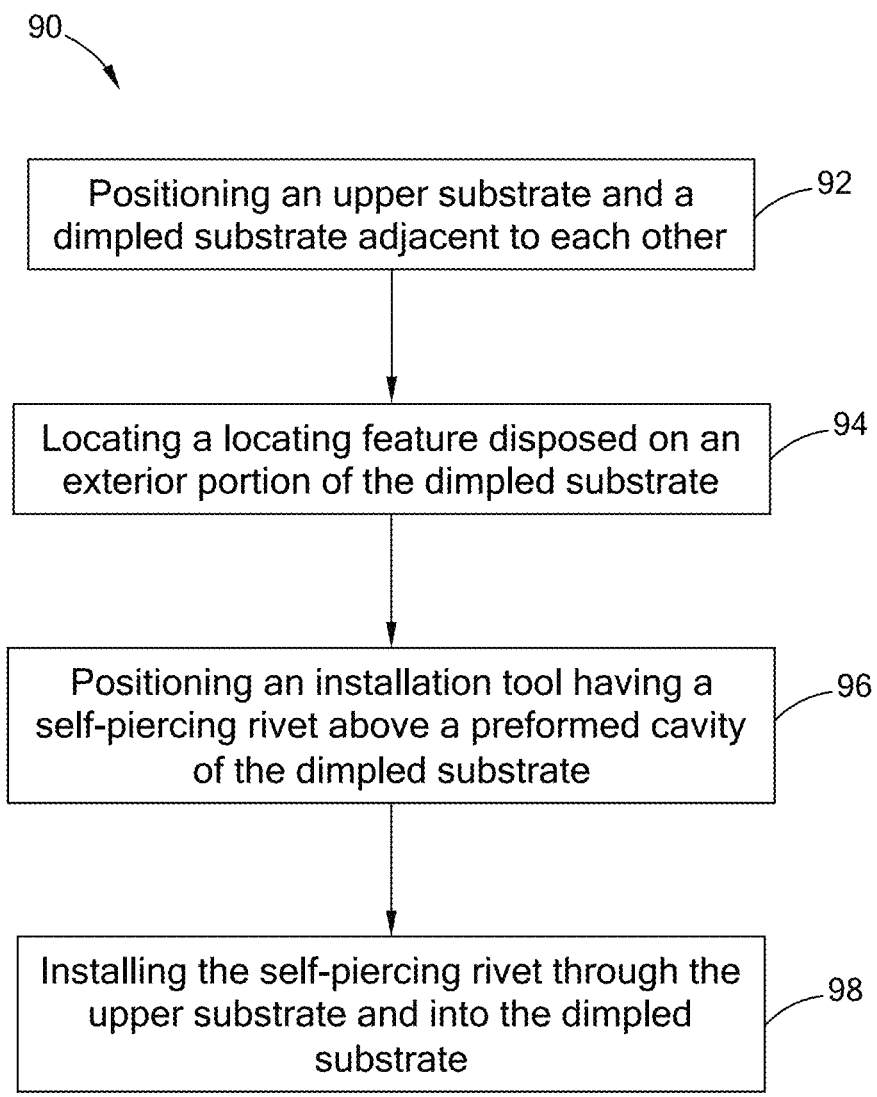
FIG. 5 is a flow chart illustrating a method of locating a feature for installation of a self-piercing rivet according to the present disclosure.

In some instances, providing a locating feature on or near the button 22 is not desired due to a subsequent manufacturing step that may mask the locating feature, such as, for example, a coating step. Therefore, as illustrated in FIGS. 4A-4C, the present disclosure provides a locating feature in the form of a notch 32" formed into the dimpled substrate 20 away from the button 22. The notch 32" is shown as being formed on an edge 62 of the dimpled substrate 20, however, should not be construed as limiting the present disclosure and thus the notch 32" may be formed in any location about the dimpled substrate 20 that allows the locating feature to be detected after subsequent manufacturing steps such as coating have been completed. The notch 32" may define any geometric shape that allows the notch 32" to be detected, such as rectangular (FIG. 4A), oval (FIG. 4B), and triangular (FIG. 4C). Just as the locating feature 32' disposed adjacent to the button 22 discussed above, it is desired to create the notch 32" and the button 22 simultaneously in order to maintain proper tolerances on locations of the notches 32" from button 22 to button 22.

Figure 6:
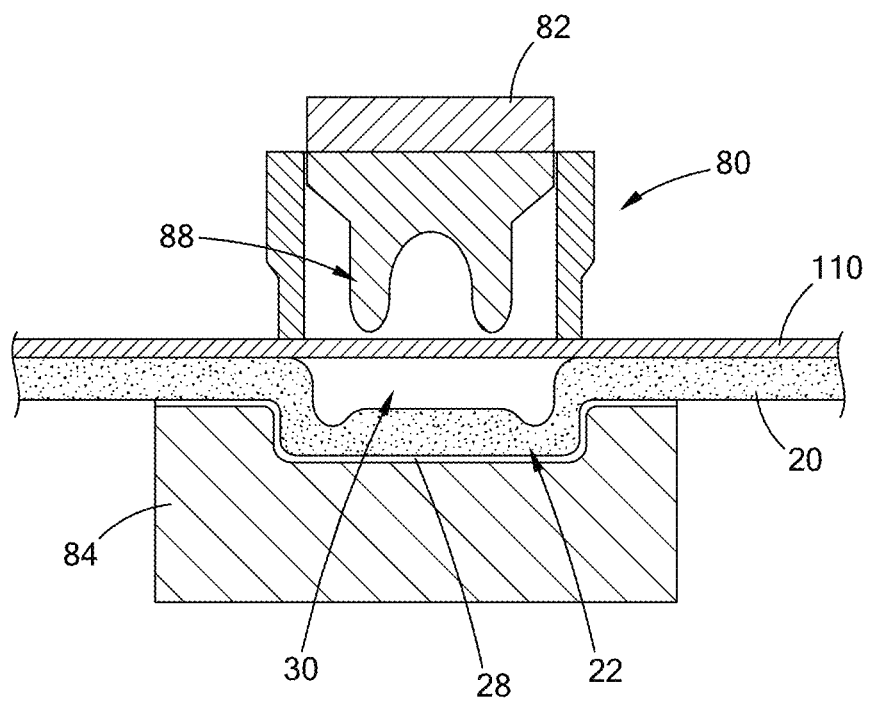
FIG. 6 is a cross-sectional view of an upper substrate and a dimpled substrate with a self-piercing rivet tool positioned to drive a self-piercing rivet into the upper substrate and the dimpled substrate.

Referring to FIGS. 6 and 7, a method 90 of locating a feature for installation of a self-piercing rivet is provided by the present disclosure. At step 92, an upper substrate is positioned and a dimpled substrate is positioned adjacent to the upper substrate, the dimpled substrate comprises at least one preformed interior cavity, at least one preformed exterior profile adjacent to the interior cavity and defining a wall therebetween, and at least one locating feature configured to identify a location of the preformed exterior profile. At step 94, a location the preformed exterior profile of the dimpled substrate is accurately determined by identifying a location of the locating feature. Thus, at step 96, accurate positioning of an installation tool having at least one self-piercing rivet above the preformed interior cavity of the dimpled substrate is accomplished. At step 98, the self-piercing rivet is installed through the upper substrate and into the dimpled substrate.

As best shown in FIG. 7, to join the dimpled substrate 20 to the upper substrate 110, the upper substrate 110 is positioned adjacent to or over the dimpled substrate 20 in a self-piercing rivet tool 80. The self-piercing rivet 120 is placed inside the self-piercing rivet tool 80 and a location of the locating feature 32 is identified by an auxiliary system such as a vision system, or other mechanical or automated system. Once the locating feature 32 is identified, the self-piercing rivet tool 80 is positioned adjacent to the locating feature 32. In other words, the self-piercing rivet 120 is placed inside the self-piercing rivet tool 80 and immediately above the preformed interior cavity 30 of the dimpled substrate 20 based on the identified location of the locating feature 32.

As further shown, the self-piercing rivet 120 has an insertion end 88 to pierce through the upper substrate 110 and to be inserted into the preformed interior cavity 30 of the dimpled substrate 20 to engage the bottom wall 28 of the button 22. It should be understood that the dimpled substrate 20 and the upper substrate 110 may be arranged in any orientation while still remaining within the scope of the present disclosure.

Because the locating feature allows for accurately identifying the location of the preformed button, the self-piercing riveting tool can be positioned such that the self-piercing rivet can be installed directly into the preformed interior cavity of the dimpled substrate while maintaining proper tolerances. Thus, accurate joining of brittle material or low-strain material to other materials using self-piercing rivet technology in a high volume automated production setting is accomplished with little or no impact on cycle time and equipment. It should also be understood that the locating feature of the present disclosure may be used in any application which requires joining of two or more layers of materials.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A dimpled substrate for use in an assembly having joined substrates, the dimpled substrate defining:
    at least one preformed interior cavity defined in an upper surface of the dimpled substrate;
    at least one preformed exterior profile extending from a lower surface of the dimpled substrate adjacent the interior cavity and defining a wall therebetween, the lower surface and the exterior profile defining an exterior portion of the dimpled substrate; and
    at least one locating feature formed into or protruding out of the exterior portion of the dimpled substrate and configured to identify a location of the at least one preformed exterior profile.

2. The dimpled substrate according to claim 1, wherein the locating feature is disposed on the preformed exterior profile.

3. The dimpled substrate according to claim 1, wherein the locating feature is disposed adjacent to the preformed exterior profile.

4. The dimpled substrate according to claim 1, wherein the locating feature is a notch formed into the dimpled substrate away from the preformed exterior profile.

5. The dimpled substrate according to claim 1, wherein the wall defines a variable thickness.

6. The dimpled substrate according to claim 1, wherein the locating feature is selected from the group consisting of surface texturing, laser marking, laser projection, ink application, dimpling, chemical etching, a notch located on an edge of the substrate, a hole through the substrate adjacent to the preformed exterior profile, an indent, a bead, and an embossment.

7. The dimpled substrate according to claim 1, wherein the locating feature is configured to identify the location of the preformed exterior profile for a vision system.

8. The dimpled substrate according to claim 1, wherein the dimpled substrate is an aluminum casting or an aluminum extrusion.

9. The dimpled substrate according to claim 1, wherein the dimpled substrate is a composite material.

10. An assembly comprising:

an upper substrate;

a dimpled substrate defining:

a preformed interior cavity defined in an upper surface of the dimpled substrate;

a preformed exterior profile extending from a lower surface of the dimpled substrate adjacent the preformed interior cavity and defining a wall therebetween, the lower surface and the preformed exterior profile defining an exterior portion of the dimpled substrate; and a locating feature formed into or protruding out of the exterior portion of the dimpled substrate and configured to identify a location of the preformed exterior profile; and a self-piercing rivet extending through the upper substrate and into the preformed interior cavity of the dimpled substrate.

11. The assembly according to claim 10, wherein the wall defines a variable thickness.

12. The assembly according to claim 10, wherein the preformed interior cavity is not plastically deformed after installation of the self-piercing rivet.

13. The assembly according to claim 10, wherein the locating feature is disposed on the preformed exterior profile.

14. The assembly according to claim 10, wherein the locating feature is disposed adjacent to the preformed exterior profile.

15. The assembly according to claim 10, wherein the locating feature is a notch formed into the dimpled substrate away from the preformed exterior profile.

16. The assembly according to claim 10, wherein the locating feature is selected from the group consisting of surface texturing, laser marking, laser projection, ink application, dimpling, chemical etching, a notch located on an edge of the substrate, a hole through the substrate adjacent to the preformed exterior profile, an indent, a bead, and an embossment.

* * * * *